(No Model.)
R. HURDLE.
DRESS CUTTER'S SCALE.
No. 395,566. Patented Jan. 1, 1889.
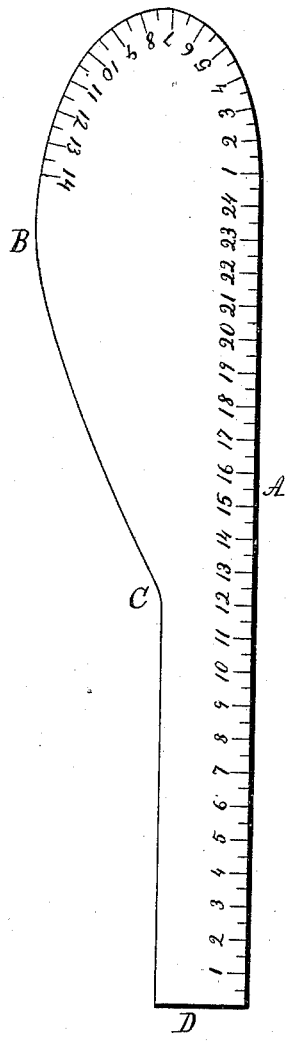
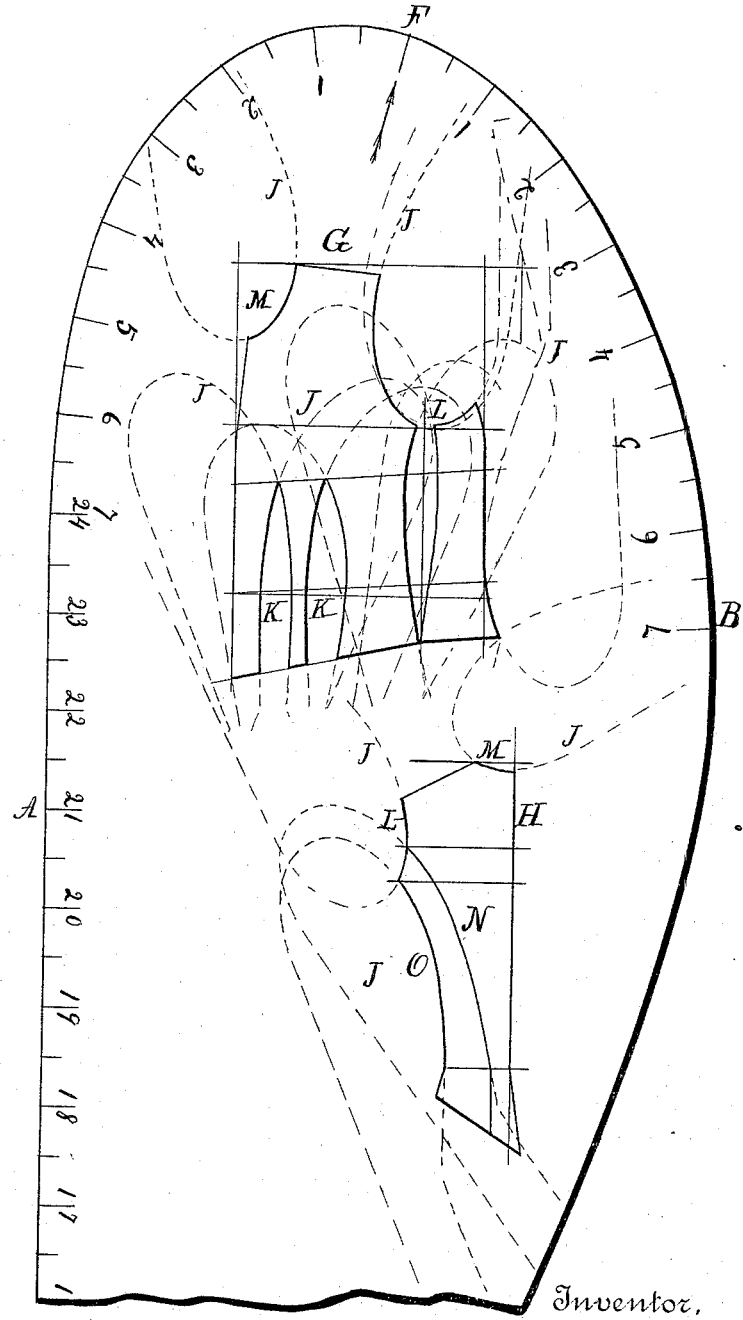
Witnesses.
S. E. E. Stevens.
P. E. Stevens.
Inventor,
Rebecca Hurdle
By her Attorney F. X. Stevens.

UNITED STATES PATENT OFFICE.

REBECCA HURDLE, OF WASHINGTON, DISTRICT OF COLUMBIA.

DRESS-CUTTER'S SCALE.

SPECIFICATION forming part of Letters Patent No. 395,566, dated January 1, 1889.

Application filed October 12, 1888. Serial No. 287,893. (No model.)

*To all whom it may concern:*

Be it known that I, REBECCA HURDLE, a citizen of the United States, residing at Washington, in the District of Columbia, have invented certain new and useful Improvements in Dress-Cutters' Scales; and I do hereby declare the following to be a full, clear, and exact description of the invention, such as will enable others skilled in the art to which it appertains to make and use the same.

This invention relates to that class of implements called "dress-cutters' scales," which are used as guides in drawing the various outlines of dress-patterns; and its object is, first, to produce a scale of such form that the different portions of its edge will serve to guide a pencil to form the proper lines, both curved and straight, to outline every portion of a dress-pattern, and, second, to provide a printed diagram upon or to accompany the said scale, showing at a glance the exact manner in which it is to be located to form every portion of the curved outline of a dress or pattern.

To this end my invention consists in a dress-cutter's scale of peculiar form and having peculiarly-located measures marked upon it, and, further, having printed upon it or accompanying it a diagram of a dress-pattern and of the scale itself in various positions for service in forming the said pattern, as hereinafter described and claimed, reference being had to the accompanying drawings, in which—

Figure I represents a dress-cutter's scale according to my invention. Fig. II represents a portion of the reverse side of the same.

The scale is made of paper-board or other suitable material. It is straight on one edge, A, for a length of two feet, and it is marked along that edge with inches and fractions thereof, numbered from 1 to 24. Beyond the twenty-fourth-inch line the body of the scale extends about five inches, and is rounded at the end in a neat semi-elliptical curve, the said twenty-four inches of straight edge being in a line tangent to the said curve. Its greatest width is six and three-quarter inches, and that is at B, opposite the twenty-third-inch line. From point B the edge recedes on a long sloping curve to a point, C, opposite to inch-line 12, where the width of the scale is two and three-quarters inches. From C to the end D of the scale the two edges of the scale are parallel with each other. From a point, F, the inch-marks are numbered each way from 1 to 7 on one side of the scale, as shown in Fig. II; but on the other side they are numbered from 1 to 14, beginning at the end of the twenty-fourth inch, which is at the end of the straight edge A, and numbering around the elliptical end of the scale, as shown in Fig. I.

On one side of my scale I print diagrams, G H, of a dress-waist pattern, having its lines numbered to correspond with reference-numbers in printed instructions for cutting dresses, which I furnish to be sold with each scale; and on each of these diagrams I show in dotted lines J the position in which my scale is to be placed to serve as a guide to the pencil of the dress-cutter in giving the exact curve required for every line to make a perfectly-fitting dress. Thus the curved edges of each dart K, the arm-size L, the neck M, the back N, and the side O have each and all of them corresponding portions in the curved outline of my scale, whereby the said lines may be instantly and accurately drawn, and the straight edge A is long enough for any of the straight lines in a dress-waist.

By means of this scale and the diagram printed on it any person skilled in the art of dress-making may be enabled to cut a dress accurately and with great expedition. The printed instructions, whereby persons not skilled in dress-making may also be enabled to use my scale with facility, I do not deem it necessary to publish herewith, because such instructions are not patentable, and they represent only my method of making measures, while the scale hereinbefore described may be used by many other methods. The edge from C to D, I make straight and parallel with the opposite edge, A, because I have no especial use for this portion, and that is the easiest way to make it. Any other form may be substituted for this portion. If a dress-cutter's scale having the curved edges described were combined with a diagram on another paper, showing a dress-pattern and the outline of the said scale in various positions partly coinciding with the pattern, it would be an equivalent of a part of my invention.

Having thus fully described my invention, what I believe to be new, and desire to secure by Letters Patent, is the following:

1. A dress-cutter's scale of semi-elliptical form at one end, and having one edge extending in a straight line tangent from one side of the said semi-ellipse and the other edge sloping inward on a long graceful curve from the other side of the said semi-ellipse to a narrow point about midway the scale, the remaining portion of the scale being narrow, substantially as shown and described.

2. A dress-cutter's scale having curved edges, substantially as described, and provided with a diagram of a dress-pattern printed on it, and showing the outline of the said scale in various positions partly coinciding with the curves of the pattern, substantially as shown and described.

3. The combination of a dress-cutter's scale having curved edges and a printed diagram showing a dress-pattern and the outline of the said scale in various positions partly coinciding with the curves of the pattern, substantially as shown and described.

In testimony whereof I affix my signature in presence of two witnesses.

REBECCA HURDLE.

Witnesses:
    FANNY WASHINGTON,
    W. X. STEVENS.